(12) United States Patent
Loeffelmann et al.

(10) Patent No.: US 12,049,926 B2
(45) Date of Patent: Jul. 30, 2024

(54) SHIFTING DEVICE

(71) Applicant: Schaeffler Technologies AG & Co. KG, Herzogenaurach (DE)

(72) Inventors: Jochen Loeffelmann, Eggolsheim (DE); Thomas Huemmer, Adelsdorf (DE); Viktor Ruder, Fürth (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 17/919,845

(22) PCT Filed: Apr. 13, 2021

(86) PCT No.: PCT/DE2021/100335
§ 371 (c)(1),
(2) Date: Oct. 19, 2022

(87) PCT Pub. No.: WO2021/223797
PCT Pub. Date: Nov. 11, 2021

(65) Prior Publication Data
US 2023/0145280 A1 May 11, 2023

(30) Foreign Application Priority Data
May 7, 2020 (DE) ............. 10 2020 112 345.0

(51) Int. Cl.
*F16D 11/14* (2006.01)
*B60K 23/08* (2006.01)
*F16D 11/00* (2006.01)

(52) U.S. Cl.
CPC .............. *F16D 11/14* (2013.01); *B60K 23/08* (2013.01); *F16D 2011/008* (2013.01); *F16D 2250/0084* (2013.01); *F16D 2300/12* (2013.01)

(58) Field of Classification Search
CPC .... F16D 2011/008; F16D 11/10; F16D 11/08; F16D 2023/141
See application file for complete search history.

(56) References Cited

U.S. PATENT DOCUMENTS 3,701,401 A * 10/1972 Palma ................. F16D 59/00
188/134
4,685,352 A * 8/1987 Ohkubo ............ B60K 17/3505
74/665 GA (Continued)

FOREIGN PATENT DOCUMENTS

DE 102009038292 A1 8/2010
DE 102014217066 A1 3/2015

(Continued)

OTHER PUBLICATIONS

See Corresponding Search Report for International Application PCT/DE2021/100335.

*Primary Examiner* — Stacey A Fluhart
(74) *Attorney, Agent, or Firm* — Davidson, Davidson & Kappel, LLC

(57) ABSTRACT

A shifting device for a drivetrain of a motor vehicle, includes a housing which a first and a second drive shaft are rotatably mounted. The first and second drive shafts are arranged coaxially to one another such that they have a common axis of rotation. The shifting device also includes a shiftable clutch device which is arranged between the first and the second drive shaft. The clutch device has an open shift position in which the first drive shaft is freely rotatable with respect to the second drive shaft, and the clutch device has a closed shift position in which the first drive shaft is connected non-rotatably by the clutch device to the second drive shaft. A control element is displaceable in the direction of the axis of rotation of the drive shafts and, depending on its displacement position, shifts the clutch device to the open (Continued)

or closed shift position. The control element is formed by a sliding sleeve which surrounds at least one of the two drive shafts, and a gear element is provided on an outer circumference of the sliding sleeve.

19 Claims, 4 Drawing Sheets

(56) References Cited

U.S. PATENT DOCUMENTS

| 4,909,364 | A | * | 3/1990 | Grimm | F16D 43/20 |
| | | | | | 192/108 |
| 5,484,043 | A | * | 1/1996 | Quick | B64C 13/341 |
| | | | | | 188/187 |
| 5,524,738 | A | | 6/1996 | Erlebach et al. | |
| 2010/0239439 | A1 | * | 9/2010 | Zwiep | F02C 7/32 |
| | | | | | 192/69.8 |
| 2013/0199885 | A1 | | 8/2013 | Quehenberger et al. | |
| 2015/0107955 | A1 | * | 4/2015 | Tronnberg | F16D 11/10 |
| | | | | | 192/69.8 |
| 2015/0380144 | A1 | | 12/2015 | Heravi et al. | |
| 2016/0040724 | A1 | * | 2/2016 | Ebihara | F16D 63/006 |
| | | | | | 74/432 |
| 2016/0363173 | A1 | * | 12/2016 | Fujii | F16D 11/14 |
| 2017/0298996 | A1 | * | 10/2017 | Mayr | B60K 17/3462 |

FOREIGN PATENT DOCUMENTS

| DE | 102014115127 A1 | 4/2015 |
| SE | 512273 C2 | 2/2000 |
| WO | WO2011098595 A1 | 8/2011 |

* cited by examiner

SHIFTING DEVICE

CROSS-REFERENCE TO RELATED APPLICATIONS

This application is the U.S. National Phase of PCT Appln. No. PCT/DE2021/100335 filed Apr. 13, 2021, which claims priority to DE 10 2020 112 345.0, filed May 7, 2020, the entire disclosures of which are incorporated by reference herein.

TECHNICAL FIELD

The present disclosure relates to a shifting device for a drivetrain of a motor vehicle.

BACKGROUND

DE 10 2014 217 066 A1 discloses a clutch for a switchable all-wheel drive, in which two aligned drive shafts are connected to one another by a clutch part that enables an interlocking connection between the two drive shafts. The clutch has a shifting element in the form of a shift fork, with which a clutch part that is displaceable in the axial direction is displaced in such a way that the interlocking connection between the two drive shafts is established.

A coupling assembly for a drivetrain of a motor vehicle is known from WO 2011/098 595 A1, which comprises at least one clutch that is arranged on a rotating shaft in order to selectively couple the rotating shaft to a drive element of the drivetrain. The coupling assembly further comprises at least one actuating device for actuating the clutch. The actuating device is designed to selectively bring an engagement section into engagement with a threaded section rotating with the shaft in order to bring about a relative movement of the engagement section and the threaded section along the axis of the rotating shaft and thereby to actuate the clutch in the axial direction.

SUMMARY

It is an object of the present application to provide an improved shifting device for a drivetrain of a motor vehicle.

A shifting device is provided for a drivetrain of a motor vehicle, comprising a housing, in which a first and a second drive shaft are rotatably mounted, wherein the first and second drive shaft are arranged coaxially with respect to one another so that they have a common axis of rotation, and a shiftable clutch device, which is arranged between the first and the second drive shaft, wherein the clutch device has an open shift position, in which the first drive shaft is freely rotatable relative to the second drive shaft, and the clutch device has a closed shift position in which the first drive shaft is connected for conjoint rotation with the second drive shaft via the clutch device, wherein a control element which is displaceable in the direction of the axis of rotation of the drive shafts is provided and, depending on its displacement position, shifts the clutch device to the open or closed shift position, wherein the control element is formed by a sliding sleeve, which surrounds at least one of the two drive shafts, wherein a gear element is provided on an outer circumference of the sliding sleeve.

A particularly simple and cost-effective control element can be realized by the sliding sleeve, which enables particularly advantageous actuating accuracy due to its stability. The sleeve shape preferably extends from the gear element all the way to the section of the actuating element that introduces the actuating forces into the clutch device. The gear element arranged on the outer circumference of the sliding sleeve can be provided, for example, only on a partial section of the sliding sleeve or alternatively also over the entire circumference of the sliding sleeve.

It is also advantageous if at least one bearing element is provided, which enables a displacement movement of the control element in the direction of the axis of rotation of the drive shafts and prevents the control element from rotating about the axis of rotation. The bearing element can ensure that the control element can reliably switch the clutch device both into the open and into the closed shift position. Furthermore, this mounting reliably prevents the control element from rotating with the rotational movement of the drive shaft. Multiple bearing elements are preferably provided, for example precisely two bearing elements, which are arranged in such a way that they support the control element at opposite points.

It is further proposed that the bearing element is formed by a pin which is immovably mounted in the housing and engages in a receptacle of the control element. By configuring the bearing element as a pin, it can be manufactured particularly cost-effectively. In order to achieve the desired mounting, the bearing element is preferably oriented in the direction of the axis of rotation. Further bearing elements for preventing unwanted movements can thus advantageously be omitted.

It is further proposed that the receptacle for the control element is open radially outward. As a result, a simpler and more cost-effective structure of the control element can be realized. Furthermore, incorporation of the control element into the bearing element during assembly is made easier. The receptacle is preferably designed in such a way that the bearing element is surrounded by a fork-like extension of the control element. Due to the fork-like extensions, the control element bears against the bearing element in the radial direction so that it can be reliably prevented from turning.

It is also proposed that the gear element of the control element is formed by an outer toothing. An easily accessible gear element can be realized by the outer toothing. The outer toothing is preferably configured to be in engagement with a pinion shaft. The outer toothing is preferably designed like the outer toothing in the manner of a toothed rack. A rotation of the pinion shaft then causes the outer toothing to be advanced so that the control element is also moved in the direction of the axis of rotation.

It is further proposed that the clutch device is formed by a dog clutch, with each drive shaft being connected for conjoint rotation with a dog clutch element. By displacing at least one of the dog clutch elements in the direction of the axis of rotation, the dog clutch makes it possible to establish a rotationally fixed connection via an interlocking connection.

According to an advantageous embodiment, two undercuts are provided on the base between two dogs of the dog clutch, the tangential extension of said undercuts corresponding to at least 10% of the tangential spacing between the adjacent dogs. For example, the tangential extension is at least 20% of the tangential spacing, further for example 30% of the tangential spacing. With a correspondingly large radius of the undercuts, the dogs can be produced by milling, so that simple and cost-effective production is made possible. The radius of the undercuts preferably corresponds to the radius of the milling machine with which the dogs are manufactured. The undercuts preferably have a constant radius and extend in the radial direction, i.e., are oriented perpendicular to the axis of rotation.

It is further proposed that the housing be made in two parts, with a first housing part having a cylindrical outer contour and a second housing part having a mounting flange with at least one fastening means, the outer radius of the mounting flange being larger than the outer radius of the cylindrical outer contour of the first housing part. This structure of the housing enables the shifting device to be installed in a space-saving manner. In the assembled state, the first housing part with the cylindrical outer contour can be inserted into a transmission housing, which is not part of this application. The fastening means on the mounting flange, which is associated with the second housing part, also enables reliable and stable fastening to the transmission housing. Multiple fastening means are preferably provided, which are arranged uniformly on the circumference of the fastening flange.

It is further proposed that the control element is mounted on a section of the drive shaft so that it can be displaced in the direction of the axis of rotation, with the second housing part having an access opening via which the control element can be actuated. By assigning the access opening to the second housing part, an advantageous functional separation of the housing can be realized. The first housing part is designed to save space so that it can protrude into the transmission housing in the assembled state. The second housing part, on the other hand, assumes the fastening function on the transmission housing and creates the conditions for being able to actuate the actuating element. Preferably, the access opening is arranged in the half of the second housing part that faces the first housing part.

It is also proposed that the clutch device is arranged entirely in the first housing part. This results in an even more advantageous separation of functions, because it has been shown that the clutch device can be accommodated in the first housing part in a space-saving manner. In this case, the control element extends from the second into the first housing part, so that the clutch device can still be controlled from the second housing part.

BRIEF SUMMARY OF THE DRAWINGS

The present disclosure is explained below by means of preferred embodiments with reference to the attached figures. In the figures.

DETAILED DESCRIPTION

Figure 1:
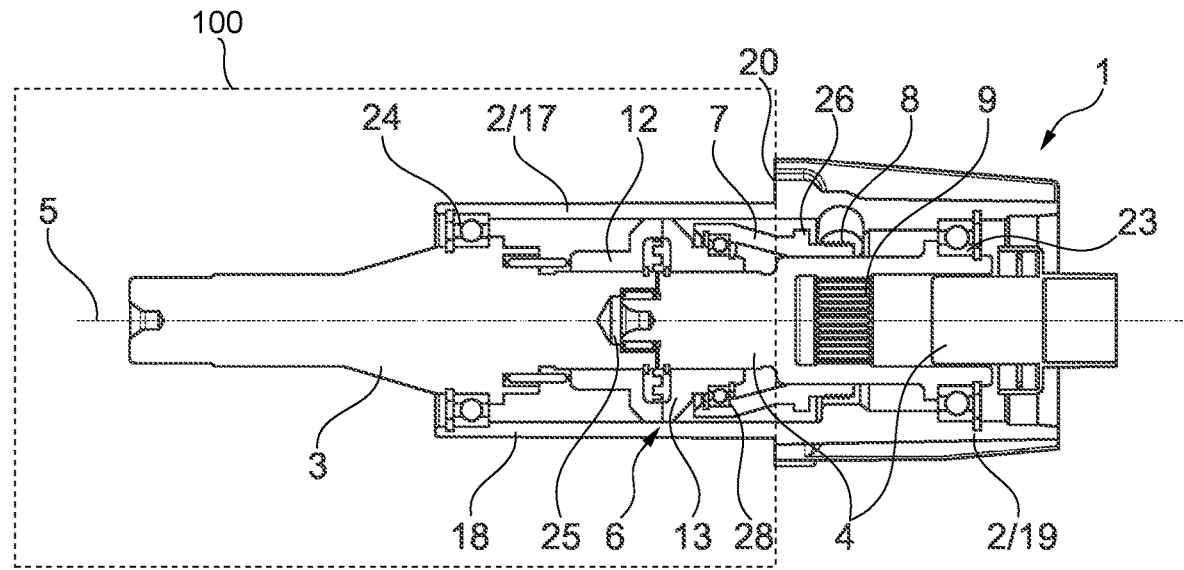
FIG. 1 shows a sectional view of a shifting device.

FIG. 1 shows a shifting device 1 with a first drive shaft 3 and a second drive shaft 4, which can be connected for conjoint rotation with one another via a clutch device 6.

The second drive shaft 4 comprises two partial shafts which are connected to one another for conjoint rotation via a toothing 9. The second drive shaft 4 is mounted at one end in a receptacle 25 of the first drive shaft 3 and opposite a housing 2 via a ball bearing 23. The first drive shaft 3 is mounted within the housing 2 by a ball bearing 24 and by an extension of the second drive shaft 4, which projects into the receptacle 25 of the first drive shaft 3. The first and second drive shafts 3 and 4 are oriented coaxially with one another and therefore rotate about a common axis of rotation 5.

One end of each of the first and second drive shafts 3 and 4 protrudes from the housing 2. In the assembled state, the first drive shaft 3 can then be connected for conjoint rotation with a differential transmission, for example, and the second drive shaft 4 to a drive wheel, for example, or vice versa.

The clutch device 6 is provided at the mutually facing ends of the first and second drive shafts 3, 4 and comprises a first dog clutch element 12 associated with the first drive shaft 3 and a second dog clutch element 13 associated with the second drive shaft 4. The clutch device 6 can be shifted into an open shift position in which the first drive shaft 3 and the second drive shaft 4 are not connected for conjoint rotation with one another. Furthermore, the clutch device 6 can be switched into a closed shift position in which the first drive shaft 3 is connected for conjoint rotation with the second drive shaft 4. The clutch device 6 is controlled by means of a control element 7, which is mounted on the second drive shaft 4 in an axially displaceable manner, i.e., in the direction of the axis of rotation 5. In this embodiment, the control element 7 is designed as a sliding sleeve, the sleeve shape extending from a gear element 8 to the point at which the control forces are introduced into the clutch device 6.

The gear element 8 has a toothing in the manner of a toothed rack, so that the gear element 8 can be displaced together with the control element 7 in the direction of the axis of rotation 5. The gear element 8 can be driven, for example, via a pinion shaft, which is not shown in FIG. 1, so that an advance of the control element 7 in the direction of the axis of rotation 5 results from a rotational movement of the pinion shaft.

The movement of the control element 7 is transmitted to the second dog clutch element 13 via an axial ball bearing 28. The axial ball bearing 28 ensures that at most a minimal torque is transmitted to the control element 7 as a result of any rotational movement of the second dog clutch element 13. The clutch device 6 can thus be switched into a closed or open shift position by means of the control device 7. By moving the control element 7 in the direction of the axis of rotation 5 towards the first dog clutch element 12, the second dog clutch element 13 in a closed shift position can be interlockingly connected to the first dog clutch element 12. By moving the control element 7 in the opposite direction, the clutch device 6 can be shifted into an open shift position in which the dog clutch elements 12 and 13 are not engaged with one another. The control element 7 also has an extension 26 which extends outwards in the radial direction and which comes into contact with the housing 2 in the open shift position so that an end position of the control element 7 is fixed.

Figure 2:
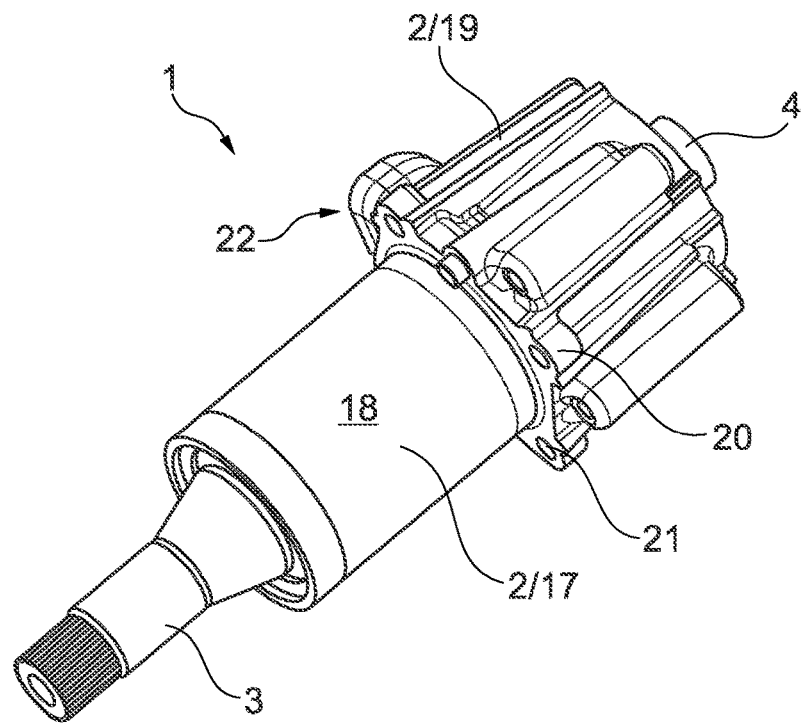
FIG. 2 shows a perspective view of a shifting device.

FIG. 2 shows a perspective view of the shifting device 1, in which a division of the housing 2 can be seen. The housing 2 has a mounting flange 20 with fastening means 21, via which the shifting device 1 can be fastened to a transmission housing 100 (shown schematically). A plurality of fastening means 21 are preferably provided so that a stable and reliable connection to the transmission housing 100 is possible. The fastening means 21 are preferably formed by bores in the mounting flange 20 so as to make simple fastening possible, for example using bolts or screws.

The housing 2 is divided into a first housing part 17 and a second housing part 19. The first housing part 17 has a cylindrical outer contour 18 so that the first housing part 17 can be inserted into a likewise cylindrical receptacle of a transmission housing 100 and can be stored there. In the mounted state, the first housing part 17 protrudes so far into the transmission housing 100 that the mounting flange 20 comes to rest on the transmission housing 100. The second housing part 19 then includes the part of the housing 2 with the mounting flange 20, which protrudes from the transmission housing 100.

Figure 3:
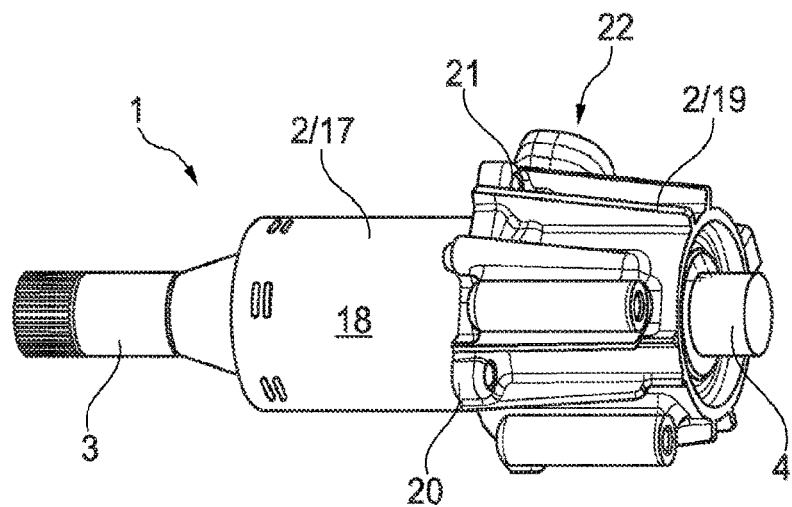
FIG. 3 shows a side view of a shifting device.

FIG. 3 shows a side view of the shifting device 1, from which it can be seen that the radial extension of the cylindrical outer contour 18 is less than that of the second housing part 19 with the mounting flange 20. As a result, the shifting device 1 can be mounted in a transmission housing 100 in a space-saving manner. This space-saving design also results from the advantageous division that the clutch device 6 is arranged in the first housing part 17 and the section of the control element 7 with the gear element 8 in the second housing part 19; see also FIG. 1.

Access is provided via an access opening 22 to drive the gear element 8 of the control element 7; this takes place, for example, via a pinion shaft (not shown), which is operatively connected to the transmission element 8 formed by an outer toothing. In the installed state, the pinion shaft is oriented perpendicular to the station axis 5.

Figure 4:
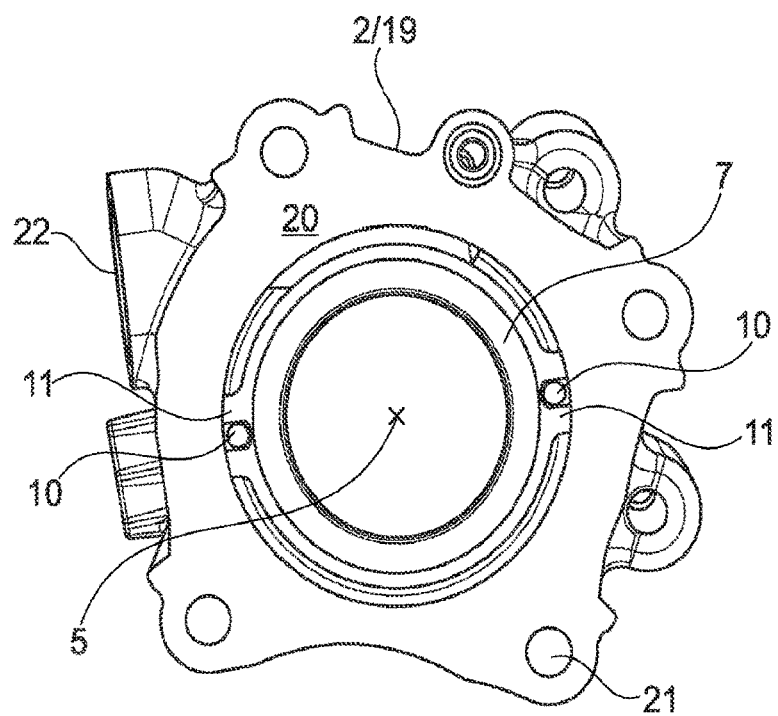
FIG. 4 shows a front view of a second housing part of a shifting device with a control element and a bearing element.

FIG. 4 shows a front view of the second housing part 19. It can be seen that the mounting flange 20 has a planar contact surface that bears against a transmission housing 100 in the mounted state. Furthermore, FIG. 4 shows the mounting of the control element 7 in the second housing part 19. Two bearing elements 10 which are oriented parallel to the axis of rotation 5 are provided for the displaceable mounting of the control element 7. The bearing elements 10 are formed by pins, which are immovably mounted in the housing 2. The control element 7 has two sections, each of which forms a receptacle 11 for the bearing element 10. The bearing element 10 is surrounded by the receptacle 11 in the manner of a fork so that the control element 7 is secured in the radial direction and cannot twist. This is advantageous because, despite the axial ball bearing 25, a torque about the axis of rotation 5 can act on the control element 7 when the second dog clutch element 13 rotates. However, a movement of the control element 7 relative to the bearing element 8 in the direction of the axis of rotation 5 remains possible. The receptacles 11 are each open radially outwards.

Figure 5:
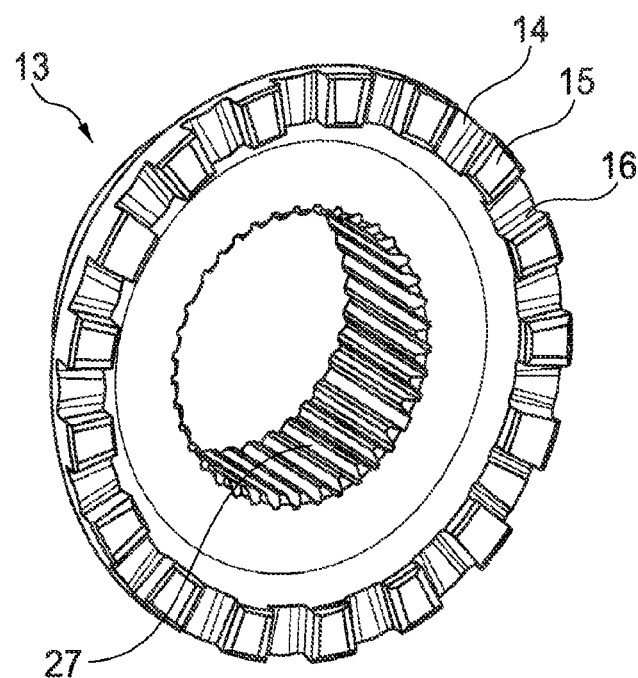
FIG. 5 shows a perspective view dog clutch element.

FIG. 5 shows a perspective view of the second dog clutch element 13, in which dogs 15 and a base 14 arranged therebetween them alternate and an undercut 16 is provided in each case at the transition between the base 14 and the dog 15. Furthermore, the second dog clutch element 13 comprises an internal toothing 27 via which the second dog clutch element 13 is connected for conjoint rotation with the second drive shaft 4.

Figure 6:
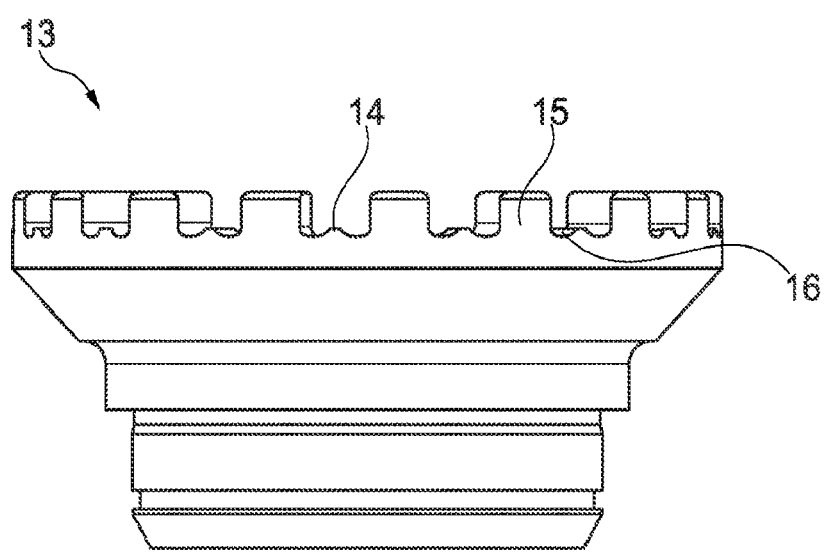
FIG. 6 is a side view of a dog clutch element.

FIG. 6 shows a side view of the second dog clutch element 13, showing the design of the undercuts 16 more clearly.

Figure 7:
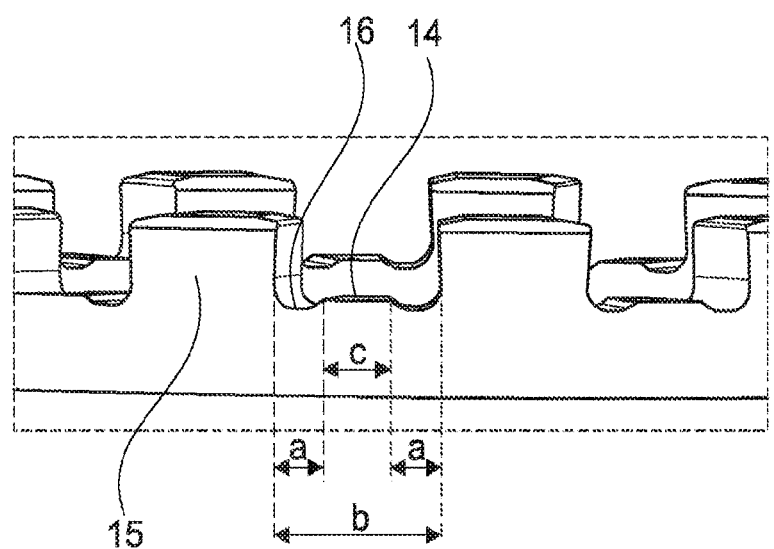
FIG. 7 shows a detailed view of a dog clutch element.

A detailed view of the undercuts 16 can be seen in FIG. 7. In this case, b corresponds to the tangential spacing between two adjacent dogs 15. The tangential extension of the undercut 16 is marked with a and corresponds to at least 10% of the tangential spacing between the dogs 15. The dogs 15 or the base 14 can thus be produced in a simple manner using a milling process. Since a milling machine with a constant radius is advantageously used for production, the tangential extension a of the undercut 16 in the radial direction also remains constant. Since the tangential extension b of the base 14 decreases radially inwards, i.e., in the direction of the axis of rotation 5 (see also FIG. 5), the tangential extension c of the planar surface of the base 14 also decreases radially inwards.

The design of the second dog clutch element 13, in particular the dogs 15, of the base 14 and the undercuts 16 and the internal toothing 27 can naturally also be transferred to the first dog clutch element 12 in a corresponding manner.

LIST OF REFERENCE SIGNS

1 Shifting device
2 Housing
3 First drive shaft
4 Second drive shaft
5 Axis of rotation
6 Clutch device
7 Control element
8 Gear element
9 Toothing
10 Bearing element
11 Receptacle (of the control element)
12 First dog clutch element
13 Second dog clutch element
14 Base (between dogs)
15 Dogs
16 Undercut
17 First housing part
18 Cylindrical outer contour
19 Second housing part
20 Mounting flange
21 Fastening means
22 Access opening
23 Ball bearing
24 Ball bearing
25 Receptacle
26 Extension
27 Inner toothing
28 Axial ball bearing
100 Transmission housing
a Tangential extension (undercuts)
b Tangential extension (base)
c Tangential extension (planar surface of the base)

What is claimed is:
1. A shifting device for a drivetrain of a motor vehicle, comprising:
a housing, in which a first drive shaft and a second drive shaft are rotatably mounted, the first and second drive shaft being arranged coaxially with respect to one another so that they have a common axis of rotation;
a shiftable clutch device arranged between the first and the second drive shaft;
the clutch device having an open shift position, in which the first drive shaft is freely rotatable relative to the second drive shaft, and
the clutch device having a closed shift position in which the first drive shaft is connected for conjoint rotation with the second drive shaft via the clutch device; and
a control element displaceable in a direction of the common axis of rotation of the drive shafts and, depending on a displacement position of the control element, the control element being configured for shifting the clutch device to the open shift position or the closed shift position,
the control element being formed by a sliding sleeve, which surrounds at least one of the first and second drive shafts, a gear element being provided on an outer circumference of the sliding sleeve,
the housing including a first housing part and a second housing part, the first drive shaft being rotatably mounted in the first housing part, the second drive shaft being rotatably mounted in the second housing part, the second housing part having a mounting flange with fastening means, via which the shifting device is fastenable to a transmission housing, the mounting flange being configured for being fastened to a transmission housing while the first housing part is inside of the transmission housing.

2. The shifting device according to claim 1, further comprising at least one bearing element, which enables a displacement movement of the control element in the direction of the common axis of rotation of the first and second drive shafts, and prevents a rotation of the control element about the common axis of rotation.

3. The shifting device according to claim 2, wherein the at least one bearing element is formed by a pin which is immovably mounted in the housing and engages in a receptacle of the control element.

4. The shifting device according to claim 3, wherein the receptacle for the control element is open radially outwards.

5. The shifting device according to claim 1, wherein the gear element of the control element is formed by an outer toothing.

6. The shifting device according to claim 1, wherein the clutch device is formed by a dog clutch, with each drive shaft being connected for conjoint rotation with a dog clutch element.

7. The shifting device according to claim 6, wherein two undercuts are provided on a base between two dogs of the dog clutch, a tangential extension of the undercuts corresponding to at least 10% of a tangential spacing between the two dogs.

8. The shifting device according to claim 1, wherein the first housing part has a cylindrical outer contour, an outer radius of the mounting flange being larger than an outer radius of the cylindrical outer contour of the first housing part.

9. The shifting device according to claim 8, wherein in the second housing part the control element is mounted on a section of the first or the second drive shaft so that the control element can be displaced in the direction of the axis of rotation, with the second housing part having an access opening via which the control element is actuable.

10. The shifting device according to claim 8, wherein the clutch device is arranged entirely in the first housing part.

11. A shifting device for a drivetrain of a motor vehicle, comprising:
a housing including a first housing part and a second housing part;
a first drive shaft rotatably mounted in the first housing part by a first bearing;
a second drive shaft rotatably mounted in the second housing part by a second bearing;
a shiftable clutch device inside the housing arranged axially between the first bearing and the second bearing, the clutch device being axially movable between an open shift position, in which the first drive shaft is freely rotatable relative to the second drive shaft, and a closed shift position in which the first drive shaft is connected for conjoint rotation with the second drive shaft via the clutch device,
the clutch device including a sliding sleeve axially displaceable to shift the clutch device to the open or closed shift position, the sliding sleeve surrounding at least one of the first and second drive shafts, an outer circumference of the sliding sleeve including a gear element,
the second housing part including a mounting flange protruding away from an outer surface of the first housing part, the mounting flange being configured for being fastened to a transmission housing,
wherein the second housing part includes an access opening to drive the gear element.

12. The shifting device according to claim 11, wherein the mounting flange is configured for being fastened to the transmission housing while the first housing part is inside of the transmission housing.

13. The shifting device according to claim 11, wherein the first drive shaft extends away from the second drive shaft and axially outside of the first housing part.

14. The shifting device according to claim 11, wherein the second drive shaft extends away from the first drive shaft and axially outside of the second housing part.

15. The shifting device according to claim 11, wherein the outer surface of the first housing part has a cylindrical contour.

16. The shifting device according to claim 11, wherein the mounting flange includes a plurality of bores configured for receiving bolts or screws.

17. The shifting device according to claim 11, wherein the mounting flange has an axially facing planar contact surface configured to bear against the transmission housing in a mounted state.

18. A method of installing the shifting device as recited in claim 11 into the transmission housing, the method comprising
inserting the first housing part into the transmission housing; and
fixing the mounting flange to the transmission housing.

19. A method of constructing a shifting device for a drivetrain of a motor vehicle, comprising:
providing a housing including a first housing part and a second housing part; and
installing first drive shaft, a second drive shaft and a shiftable clutch device inside of the housing,
the first drive shaft being rotatably mounted in the first housing part by a first bearing, the second drive shaft being rotatably mounted in the second housing part by a second bearing,
the shiftable clutch device being axially movable between an open shift position, in which the first drive shaft is freely rotatable relative to the second drive shaft, and a closed shift position in which the first drive shaft is connected for conjoint rotation with the second drive shaft via the clutch device,
the clutch device including a sliding sleeve axially displaceable to shift the clutch device to the open or closed shift position, the sliding sleeve surrounding at least one of the first and second drive shafts, an outer circumference of the sliding sleeve including a gear element,
the second housing part including a mounting flange protruding away from an outer surface of the first housing part, the mounting flange being configured for being fastened to a transmission housing while the first housing part is inside of the transmission housing.

* * * * *